(12) United States Patent
Masuyama (10) Patent No.: US 7,306,412 B2
(45) Date of Patent: Dec. 11, 2007

(54) ROTARY MILLING CUTTER AND MILLING METHOD USING THE SAME TECHNICAL FIELD

(75) Inventor: Keizo Masuyama, Osaka (JP)

(73) Assignee: Shinjo Metal Industries, Ltd., Osaka (JP)

( * ) Notice: Subject to any disclaimer, the term of this patent is extended or adjusted under 35 U.S.C. 154(b) by 40 days.

(21) Appl. No.: 10/570,327

(22) PCT Filed: Aug. 19, 2004

(86) PCT No.: PCT/JP2004/011888

§ 371 (c)(1),
(2), (4) Date: Mar. 2, 2006

(87) PCT Pub. No.: WO2005/023473

PCT Pub. Date: Mar. 17, 2005

(65) Prior Publication Data

US 2007/0014644 A1    Jan. 18, 2007

(30) Foreign Application Priority Data

Sep. 5, 2003   (JP) .............................. 2003-314356

(51) Int. Cl.
*B23C 3/18* (2006.01)
*B23C 3/26* (2006.01)
*B23C 3/12* (2006.01)

(52) U.S. Cl. ..................... 409/132; 409/80; 409/84; 409/120; 409/167; 409/199; 29/889.7; 700/187; 700/190; 407/54; 407/63; 407/118; 407/120

(58) Field of Classification Search ................ 409/131, 409/132, 79, 80, 84, 119, 120, 165, 166, 167, 409/199; 29/889, 889.23, 889.6, 889.7, 27 C; 700/187, 190; 407/53, 54, 55, 56, 57, 58, 407/59, 60, 61, 62, 63, 113, 117, 118, 119, 407/120; 408/144, 230; 299/111, 113
See application file for complete search history.

(56) References Cited

U.S. PATENT DOCUMENTS

| | | | | | |
|---|---|---|---|---|---|
| 3,313,186 | A | * | 4/1967 | Rochon | 408/57 |
| 3,460,410 | A | * | 8/1969 | Briles | 408/57 |
| 3,830,546 | A | * | 8/1974 | Kniff | 299/107 |
| 3,947,143 | A | * | 3/1976 | Gulla | 408/230 |

(Continued)

FOREIGN PATENT DOCUMENTS

JP       61-270012 A      11/1986

(Continued)

*Primary Examiner*—Dana Ross
(74) *Attorney, Agent, or Firm*—Global IP Counselors, LLP (57) ABSTRACT

An end mill 10 is a tool for milling a metal block such as a metal mold and is placed in a machine tool such as a milling machine when in use. The end mill 10 is used to provide a rotary milling cutter and a milling method using the same, in which it is possible to perform orthogonal milling and pocket milling to efficiently form four corners with small radius, without repeatedly milling using a small-diameter end mill. The end mill 10 has two cutting edges 11*a* and 11*b* at its distal portion, and an edge angle D1 formed by the two cutting edges 11*a* and 11*b* is 70.53 degrees.

11 Claims, 9 Drawing Sheets

U.S. PATENT DOCUMENTS

| | | | |
|---|---|---|---|
| 4,176,992 A * | 12/1979 | Ross et al. | 409/131 |
| 4,570,952 A * | 2/1986 | Heimbigner et al. | 408/56 |
| 4,725,099 A * | 2/1988 | Penkunas et al. | 299/111 |
| 4,784,540 A * | 11/1988 | Underhaug | 409/140 |
| 4,911,504 A * | 3/1990 | Stiffler et al. | 407/118 |
| 4,968,195 A * | 11/1990 | Hayakawa et al. | 409/84 |
| 5,026,227 A * | 6/1991 | Nishi et al. | 407/119 |
| 5,219,209 A * | 6/1993 | Prizzi et al. | 299/111 |
| 5,324,098 A * | 6/1994 | Massa et al. | 299/111 |
| 5,378,091 A * | 1/1995 | Nakamura | 409/132 |
| 5,415,462 A * | 5/1995 | Massa | 299/106 |
| 5,996,714 A * | 12/1999 | Massa et al. | 407/41 |
| 6,022,175 A * | 2/2000 | Heinrich et al. | 407/54 |
| 6,109,377 A * | 8/2000 | Massa et al. | 175/417 |
| 6,170,917 B1 * | 1/2001 | Heinrich et al. | 299/110 |
| 6,196,636 B1 * | 3/2001 | Mills et al. | 299/111 |
| 6,270,165 B1 * | 8/2001 | Peay | 299/111 |
| 6,375,272 B1 * | 4/2002 | Ojanen | 299/111 |
| 6,428,252 B1 * | 8/2002 | Oldani | 409/132 |
| 6,478,383 B1 * | 11/2002 | Ojanen et al. | 299/111 |
| 6,655,882 B2 * | 12/2003 | Heinrich et al. | 408/144 |
| 6,846,135 B2 * | 1/2005 | Kuroda et al. | 407/53 |
| 6,899,494 B2 * | 5/2005 | Walrath | 407/54 |
| 7,097,540 B1 * | 8/2006 | Gosinski et al. | 29/558 |
| 2002/0071732 A1 | 6/2002 | Funaki et al. | |

FOREIGN PATENT DOCUMENTS

| | | |
|---|---|---|
| JP | 63-131315 U | 8/1988 |
| JP | 3-79213 A | 4/1991 |
| JP | 6-8026 | 1/1994 |
| JP | 9-117845 A | 5/1997 |
| JP | 10-128610 | 5/1998 |
| JP | 2000-5915 A | 1/2000 |
| JP | 2000-263308 A | 9/2000 |
| JP | 2002-182716 A | 6/2002 |
| JP | 2003-53616 A | 2/2003 |

* cited by examiner

ROTARY MILLING CUTTER AND MILLING METHOD USING THE SAME TECHNICAL FIELD

TECHNICAL FIELD

The present invention relates to a rotary milling cutter such as an end mill to be used for milling metals and the like, and a milling method using the same.

BACKGROUND ART

Conventionally, in the field of milling of metals and the like, a rotary milling cutter such as an end mill that performs milling by rotating about a rotation axis has been used. Such a rotary milling cutter is provided with a cutting edge at its distal portion or at a side of the distal portion, and is capable of milling by rotating about the rotation axis.

Figure 6:
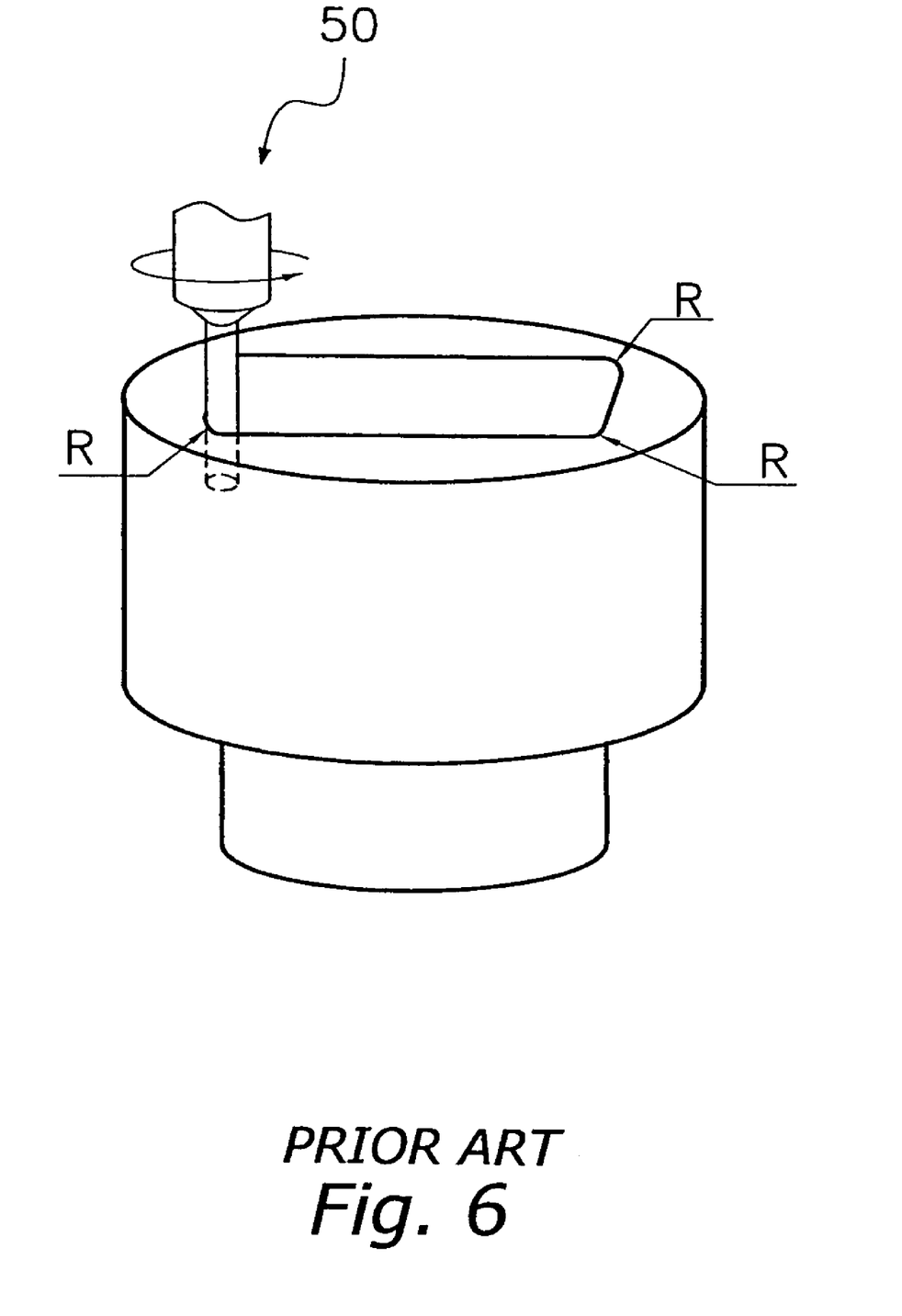
FIG. 6 shows an example of an object that was milled by a conventional milling method.

This type of rotary milling is used, for example, for forming metal molds. When pocket milling is performed on metal blocks to be used as metal mold materials, rough milling is performed using a large-diameter end mill for the purpose of reducing processing time. Then, as shown in FIG. 6, four corners are formed using an end mill having a diameter suitable to the desired pocket shape.

However, the above-mentioned rotary milling method that uses a conventional end mill and the like has the following problems.

Specifically, the above-mentioned rotary milling cutter such as an end mill performs milling by rotating about the rotation axis. Therefore, as in the above case of forming a metal mold, when a block metal piece is pocket milled with a predetermined depth, the size of each angle R of the four corners of the pocket will coincide with the diameter of an end mill 50, as shown in FIG. 6.

Accordingly, when intending to pocket mill and form each corner with a small R of 0.1 mm to 0.2 mm, which is close to a right angle, it is necessary to repeat milling over and over again using a small-diameter end mill with R 0.1 mm to 0.2 mm after rough milling. Consequently, there is a problem in that the time and cost required for processing will increase.

In addition, in order to mill and form the four corners with angles as close to perpendicular as possible, the diameter of an end mill needs to be as small as 0.1 mm to 0.2 mm, and thus the strength of the distal portion of the end mill will drop and the distal portion will become easily breakable during milling and the like.

Further, although several prior art documents cited below disclose milling methods in which an end mill is used, these documents do not disclose anything regarding a milling method for orthogonal milling or edge milling in which a very small corner R is formed (see for example Japanese Laid-Open Patent Application Nos. 2003-53616 (published on Feb. 26, 2003), 2000-263308 (published on Sep. 26, 2000), 2000-5915 (published on Jan. 11, 2000), 10-128610 (published on May 19, 1998), and 06-8026 (published on Jan. 18, 1994).

DISCLOSURE OF INVENTION

It is an object of the present invention to provide a rotary milling cutter and a milling method using the same, in which it is possible to efficiently perform orthogonal milling or edge milling for forming a very small corner R, without using a small-diameter end mill and milling repeatedly.

A rotary milling cutter according to a first aspect of the present invention is a rotary milling cutter for milling an object to be milled by rotating about a rotation axis, the rotary milling cutter having at least one cutting edge at its distal portion. Also, the angle of each cutting edge relative to the rotation axis is set to be about 35 degrees.

Here, the angle of the each cutting edge relative to the rotation axis of the rotary milling cutter is specified to be about 35 degrees. In this way, one of the cutting edges forming an edge angle is set along a face of a right-angled tetrahedron, and milling is performed such that the rotary milling cutter is pulled up in a direction that is 90 degrees to the face, while the rotary milling cutter is held at a certain angle. By so doing, orthogonal milling between the x-y plane and the z-axis, for example, can be achieved. Then by milling in a similar way in the direction of x-axis relative to the y-z plane and in the direction of y-axis relative to the z-x plane, three-dimensional orthogonal milling can be achieved. Accordingly, by performing milling in a similar way on four corners of a pocket to be formed, it is possible to perform pocket milling in which the cross-sectional shape of the pocket is rectangular. In this way, three-dimensional orthogonal milling and edge milling of a very small corner R can be achieved, without using a small-diameter rotary milling cutter and milling repeatedly.

Note that the above-mentioned angle (about 35 degrees) of each cutting edge relative to the rotation axis can be determined by the following equation. In other words, with a right-angled tetrahedron that is formed as a result of three-dimensional orthogonal milling, a first perpendicular line drawn from the apex of the right-angled tetrahedron to its base divides a second perpendicular line drawn from the apex of an equilateral triangle formed on the base to the opposite side of the equilateral triangle at a ratio of 2:1, the base being a surface of an object to be milled. In addition, three triangles that are formed by these perpendicular lines are similar figures. Therefore, provided that the length of the side divided at a ratio of 2:1 is 3, the length of the first perpendicular line will be $\sqrt{2}$. Accordingly, an angle α necessary to achieve three-dimensional orthogonal milling can be calculated by the following equation.

Since $\tan \alpha = 1/\sqrt{2}$, $$\alpha = \arctan(1/\sqrt{2}) = 35.2644 \cdots \approx 35(°)$$

A rotary milling cutter according to a second aspect of the present invention is the rotary milling cutter according to the first aspect, wherein the rotary milling cutter comprises a plurality of cutting edges disposed on the rotation axis.

Here, at least two cutting edges for three-dimensional orthogonal milling are disposed on the rotation axis of the rotary milling cutter. Because of this, the cutting resistance will be lower than when milling with one cutting edge, thus enabling more stable milling.

A rotary milling cutter according to a third aspect of the present invention is the rotary milling cutter according to the first or second aspects, wherein the rotary milling cutter is an end mill.

Here, the present invention is applicable to an end mill. Accordingly, it is possible to provide an end mill capable of three-dimensional orthogonal milling.

A milling method using a rotary milling cutter according to a fourth aspect of the present invention is a milling method using a rotary milling cutter that rotates about the rotation axis to perform V-groove milling on an object to be milled with at least one cutting edge provided at the distal portion. In a first step, the rotary milling cutter is moved and milling is performed until the distal portion of the rotary milling cutter reaches a predetermined point. In a second step, milling is performed by pulling up the rotary milling cutter whose distal portion is at the predetermined point in the direction in which a V-groom is formed, in a state in which the rotary milling cutter is inclined at a certain angle.

Here, a description is provided of a milling method for, for example, forming a pyramid shape such a tetrahedron and a V-groove that constitutes a portion of a pyramid. Specifically, first, the distal portion of the rotary milling cutter is moved to a point that becomes the apex of a tetrahedron while milling is performed. Then, milling is performed by pulling up the rotary milling cutter from the above-mentioned point in the direction of each side of the tetrahedron while the inclination of the rotary milling cutter is maintained at a fixed angle.

By so doing, it is possible to form a pyramid shape or a V-groove that constitutes a portion of a pyramid shape, even with a rotary milling cutter which is typically used for circular milling. Accordingly, three-dimensional orthogonal milling and edge milling of a very small corner R can be achieved without using a small-diameter rotary milling cutter and milling repeatedly.

A milling method using a rotary milling cutter according to a fifth aspect of the present invention is the milling method using a rotary milling cutter according to the fourth aspect, wherein, in the second step, the rotary milling cutter is pulled up in the direction of the intersection of two tangents of a circle that is formed on the surface of an object to be milled as a result of milling using the rotary milling cutter.

Here, the description concerns the pulling direction of the rotary milling cutter when forming a pyramid shape or a portion thereof through milling. This milling method enables V-groove milling in which the milling depth gradually becomes shallow, and by applying this method, milling to form pyramid shapes can be easily performed.

A milling method using a rotary milling cutter according to a sixth aspect of the present invention is the milling method using a rotary milling cutter according to the fourth or fifth aspects, wherein the angle of the each cutting edge attached to the distal portion of the rotary milling cutter is about 35 degrees relative to the rotation axis.

Here, the angle of each cutting edge relative to the rotation axis of the rotary milling cutter is specified to be about 35 degrees. Accordingly, one of the cutting edges forming an edge angle is set along a face of a right-angled tetrahedron, and milling is performed such that the rotary milling cutter is pulled up in a direction that is 90 degrees to the face. By so doing, it is possible in particular to form a three-dimensional orthogonal shape among the above-mentioned pyramid shapes. Consequently, it is possible to perform pocket milling and the like in which four right angle corners are formed.

Note that the above-mentioned angle (about 35 degrees) of the each cutting edge relative to the rotation axis can be determined by the following equation.

Specifically, with a right-angled tetrahedron formed as a result of three-dimensional orthogonal milling, a first perpendicular line drawn from the apex of the right-angled tetrahedron to its base divides a second perpendicular line drawn from the apex of an equilateral triangle shape formed on the base to the opposite side of the equilateral triangle at a ratio of 2:1, the base being a surface of an object to be milled. Three triangles formed by these perpendicular lines are similar figures. Therefore, provided that the length of the side divided at a ratio of 2:1 is 3, the length of the first perpendicular line will be $\sqrt{2}$. Accordingly, an angle $\alpha$ necessary to achieve three-dimensional orthogonal milling can be calculated by the following equation.

Since tan $\alpha=1/\sqrt{2}$, $$\alpha=\arctan(1/\sqrt{2})=35.2644\cdots\approx35(°)$$

A milling method using a rotary milling cutter according to a seventh aspect of the present invention is the milling method using a rotary milling cutter according to the sixth aspect, wherein the rotary milling cutter comprises a plurality of cutting edges disposed on the rotation axis.

Here, at least two cutting edges for three-dimensional orthogonal milling are disposed to the rotation axis of the rotary milling cutter. Consequently, the cutting resistance is reduced lower than when milling is performed with one cutting edge, thus enabling more stable milling.

A milling method using a rotary milling cutter according to an eighth aspect of the present invention is the milling method using a rotary milling cutter according to the sixth or seventh aspect, wherein, in the second step, milling is performed in a state in which the rotation axis of the rotary milling cutter is inclined at about 55 degrees relative to the direction perpendicular to a milling surface of an object to be milled.

Here, the inclination angle is maintained at about 55 degrees when milling is performed. In this way, one of the cutting edges provided at the distal portion of the rotary milling cutter can be fitted along one of the surfaces in three dimensions, which form a right angle. Consequently, milling is performed by pulling the rotary milling cutter in the direction perpendicular to the one surface while maintaining the inclination angle at a certain angle, so that three-dimensional orthogonal milling can be achieved using the rotary milling cutter, without the cutting edges interfering with the other surfaces in three dimensions.

A milling method using a rotary milling cutter according to is the milling method using a rotary milling cutter according to any one of the fourth to eighth aspects, wherein the rotary milling cutter is an end mill.

Here, the milling method using a rotary milling cutter according to the present invention can be used with an end mill. Accordingly, it is possible to provide an end mill capable forming a pyramid shape, and particularly capable of forming a three-dimensional right angle.

A milling method using a rotary milling cutter according to a tenth aspect of the present invention is a milling method using a rotary milling cutter, wherein the rotary milling cutter rotates about the rotation axis in order to mill an object with a cutting edge provided at the distal portion, the milling method comprising a first step and a second step. The object to be milled has three plane surfaces that mutually intersect perpendicularly. In the first step, the rotary milling cutter having the cutting edge attached to the distal portion at an angle of about 35 degrees relative to the rotation axis is set such that the rotary milling cutter is held up perpendicular to a first plane surface among the three plane surfaces of the object to be milled. In the second step, milling is performed while moving the rotary milling cutter at 45 degrees relative to a side of the first plane surface that forms a corner portion thereof.

Here, the rotary milling cutter having the cutting edge whose angle relative to the rotation axis is about 35 degrees is held up perpendicular to the first surface among the three mutually perpendicularly intersecting plane surfaces of the object to be milled, and in this state, the rotary milling cutter is moved at 45 degrees relative to a side that forms a corner of the first surface. Consequently, it is possible to form an equilateral triangle that is uniformly milled on each of the three plane surfaces mentioned above.

The milling method using a rotary milling cutter according to the present invention takes advantage of this principle so that a corner portion formed as a result of 45 degree chamfering on an intersecting portion between the first surface and another surface among the three plane surfaces can be chamfered at 45 degrees by a similar milling method as in the case of forming an equilateral triangle described above. Consequently, it is possible to chamfer the above-mentioned corner portion very efficiently and highly accurately, compared to the case in which the above-mentioned corner portion is chamfered by hand by skilled workers, or the case in which the above-mentioned corner portion is chamfered by adjusting the rotation axis of a rotary milling cutter having a 45 degree cutting edge to a chamfering angle of the corner.

DESCRIPTION OF THE REFERENCE SYMBOLS

10 End mill (rotary milling cutter)
11a Cutting edge (first cutting edge)
11b Cutting edge (second cutting edge)
20a to 20e Object to be milled
30a, 30b Object to be milled
40a, 40b Object to be milled
D1 Edge angle
D2 Inclination angle

PREFERRED EMBODIMENTS OF THE INVENTION

Structure of End Mill

Figure 1:
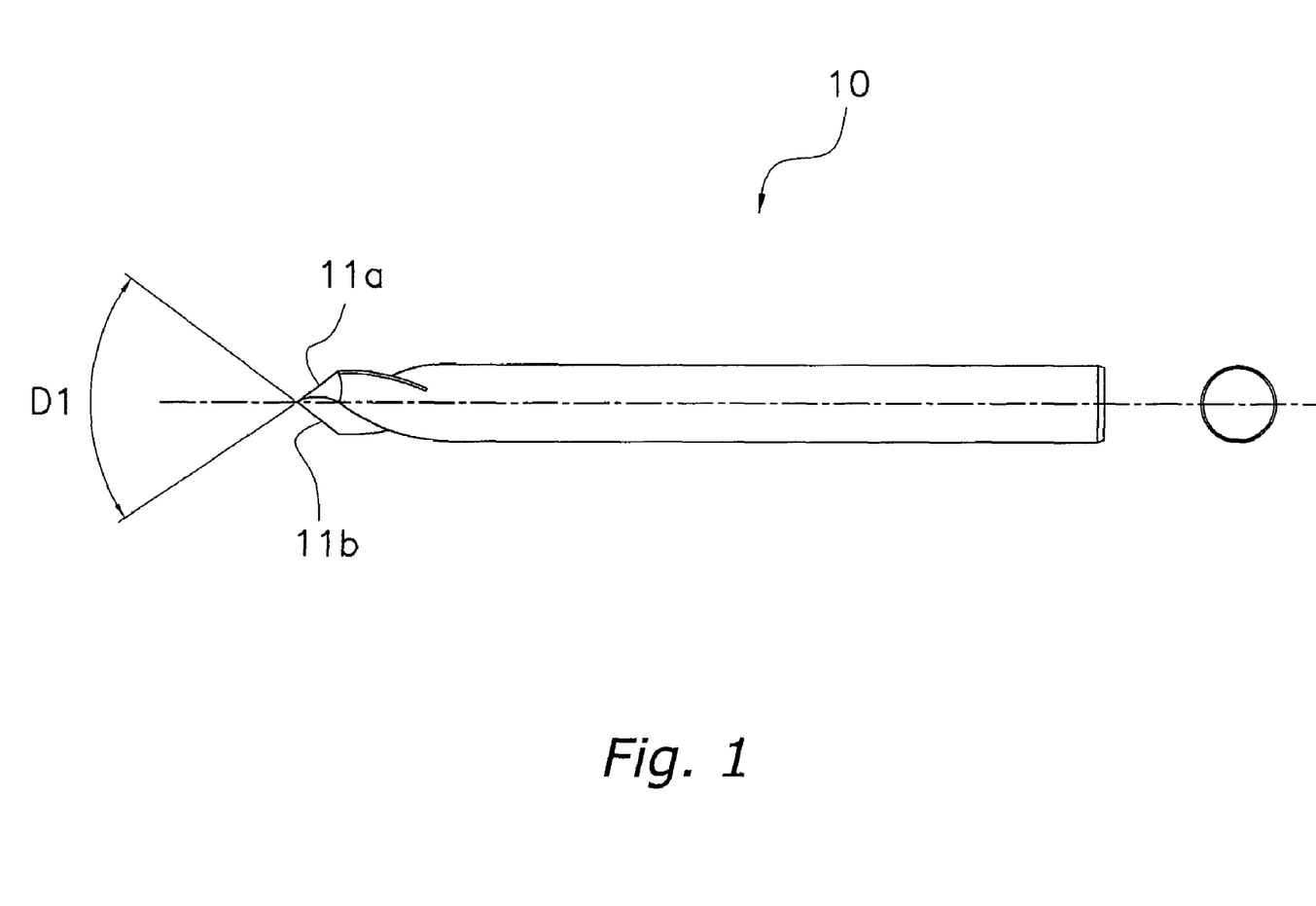
FIG. 1 is a lateral view showing an end mill according to an embodiment of the present invention.

An end mill (rotary milling cutter) 10 according to an embodiment of the present invention is a tool for milling a block of metal such as a metal mold, and is set in a machine tool such as a milling machine when in use. This end mill 10 includes, as shown in FIG. 1, two cutting edges 11a and 11b at the distal portion. These cutting edges 11a and 11b are placed symmetrically relative to the rotation axis, each having an angle of 35.26 degrees relative to the rotation axis. Consequently, an edge angle D1 formed by these two cutting edges 11a and 11b is 70.53 degrees as shown in FIG. 1.

This edge angle D1 is a numerical value that is calculated to achieve three-dimensional orthogonal milling by using a rotary milling cutter such as the end mill 10.

Figure 2:
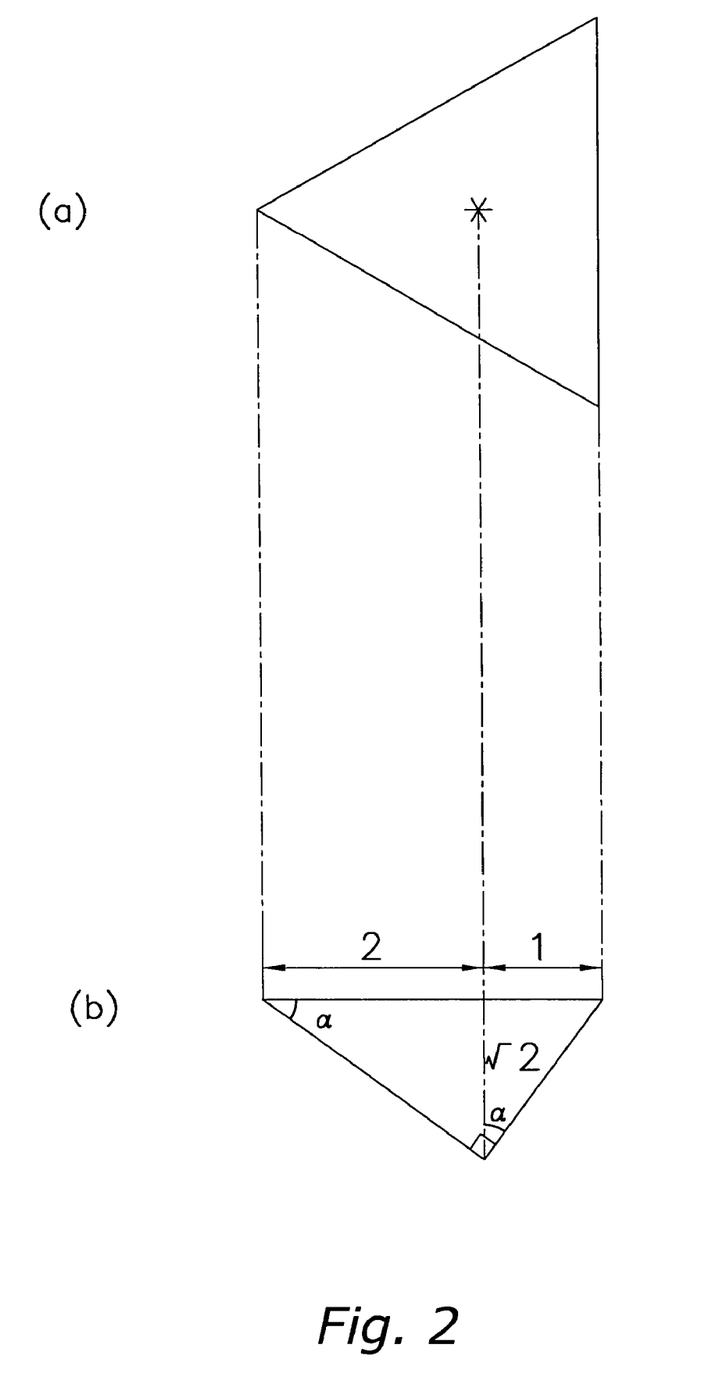
FIG. 2 describes a milling method for forming a pyramid shape using the end mill of FIG. 1.

Here, referring to FIG. 2(a) and FIG. 2(b), the edge angle D1 of the end mill 10 will be described below. FIG. 2(a) shows a top view of an object that was pocket milled into a right-angled tetrahedron by the milling method according to the present invention, and FIG. 2(b) shows a cross-sectional view of the above-mentioned object that was pocket milled into the above-mentioned right-angled tetrahedron.

As shown in FIG. 2(a), when a right-angled tetrahedron is formed by milling, the base of the right-angled tetrahedron formed thereby will be a surface of the milled object, and the surface is an equilateral triangle in shape. Accordingly, as shown in FIG. 2(b), a perpendicular line drawn from the apex of the right-angled tetrahedron to the base of the right-angled tetrahedron will divide the base of the right-angled tetrahedron at a 2:1 ratio, the base having the equilateral triangle shape in a cross-sectional view as shown in FIG. 2(b). Here, the three triangles shown in FIG. 2(b) are all similar figures. Therefore, the edge angle D1 of the end mill 10, which is necessary for forming the right-angled tetrahedron, can be calculated by the following equation.

Using the angle α shown in FIG. 2(b),
since $\tan\alpha = 1/\sqrt{2}$, $$\alpha = \arctan(1/\sqrt{2}) \approx 35.26(°)$$

Therefore, the edge angle D1 of the end mill 10, that is, the rotary milling cutter, will be twice as great as the above-mentioned angle α, and which consequently can be calculated by the following equation.

$$D1 = \alpha \times 2 = 35.26 \cdots \times 2 \approx 70.53(°)$$

Milling Method Using the End Mill of the Present Invention

Figure 3:
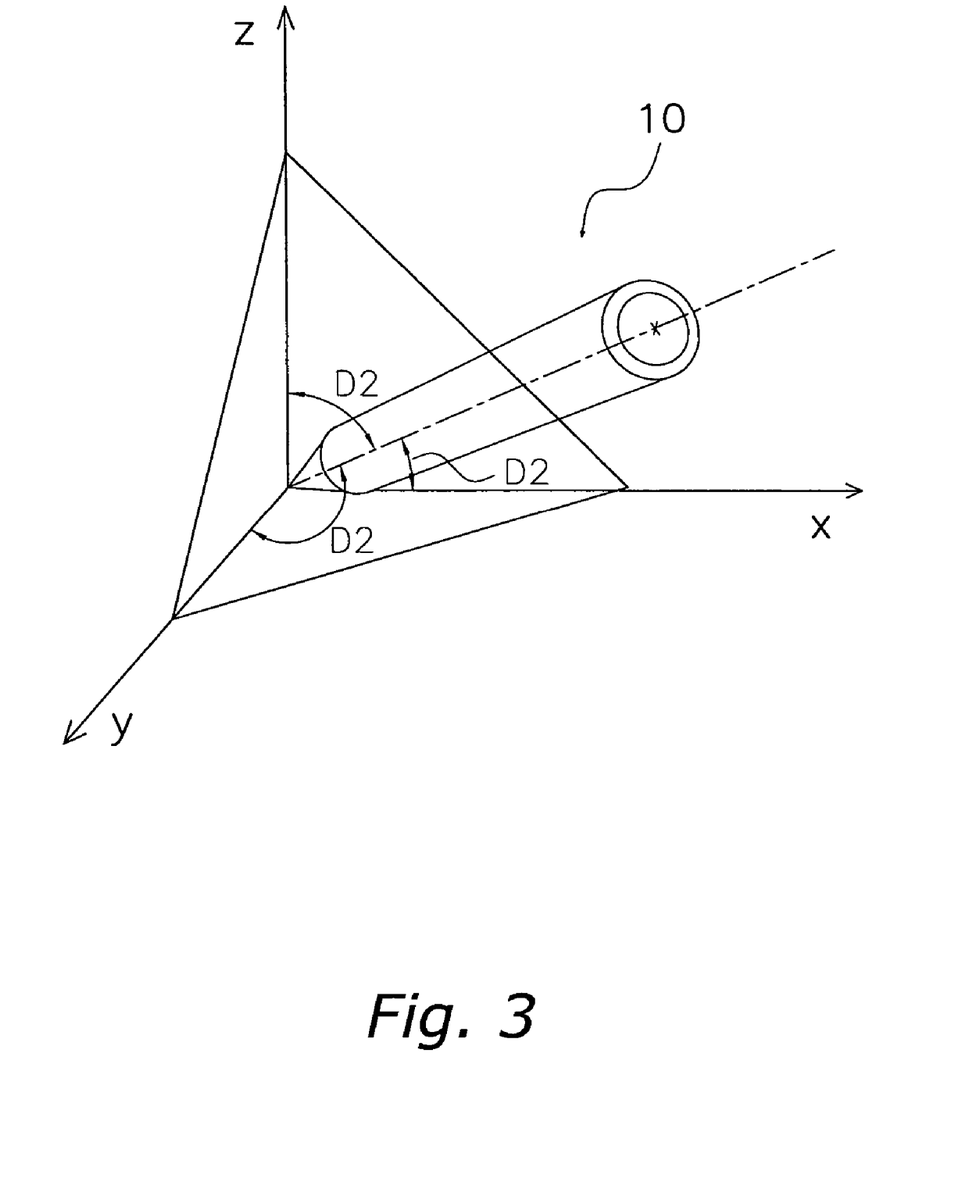
FIG. 3 is a schematic view showing a milling method that uses the end mill of FIG. 1.

According to a milling method using the end mill 10 of this embodiment, as shown in FIG. 3, milling is performed in a state in which the rotation axis of the end mill 10 is tilted only by an inclination angle D2 from each of the x-axis, y-axis, and z-axis. In this embodiment, the inclination angle D2 is 54.74 degrees. This angle is determined in accordance with the edge angle D1 of the end mill 10.

Specifically, the edge angle D1 of the end mill 10 is about 71 degrees as described above. The two cutting edges 11a and 11b are disposed such that the angle α of the each of the cutting edges 11a and 11b relative to the rotation axis is about 35 degrees. Accordingly, when milling a predetermined surface of an object with the cutting edges 11a and 11b, the angle formed by the rotation axis and the predetermined surface of the object must coincide with the angle α (35.26 degrees) of each of the cutting edges 11a and 11b relative to the rotation axis. Here, when substituting this angle α (35.26 degrees) for the angle between the rotation axis and the direction perpendicular to the surface of the object, the angle of 54.74 degrees can be determined by the following equation.

$$90 - 35.26 \approx 54.74(°)$$

According to the milling method using the end mill 10 of this embodiment, as described above, the end mill 10 with the edge angle D1 of about 71 degrees is used for milling in a state in which the rotation axis of the end mill 10 is inclined at the inclination angle D2 (about 55 degrees) relative to each axial direction, as shown in FIG. 3. Then, milling is performed by pulling the end mill 10 in each axial direction shown in FIG. 3, thus achieving pocket milling to form a right-angled tetrahedron, in other words, three-dimensional orthogonal milling.

A milling method based on the above-mentioned milling for forming a right-angled tetrahedron is shown in FIG. 4(a) through FIG. 4(e).

Figure 4:
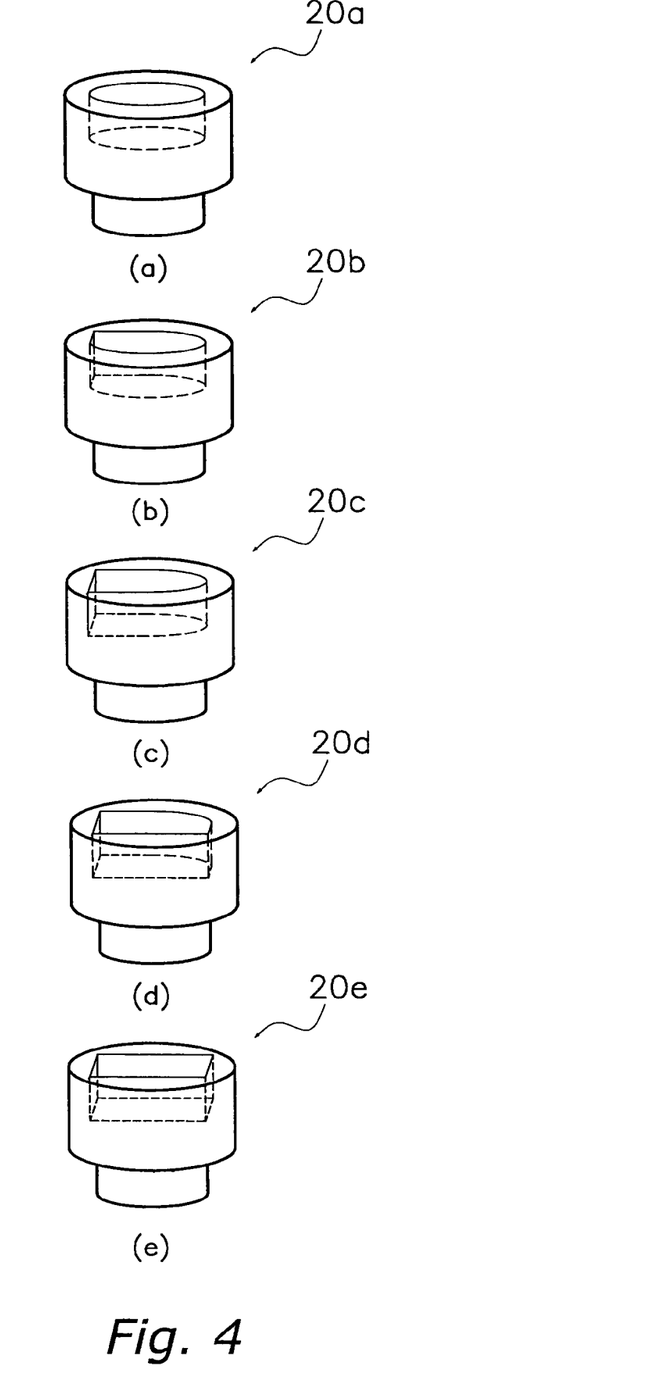
FIGS. 4(a) through 4(e) each show an object to be milled by means of three-dimensional orthogonal milling according to the milling method shown in FIG. 2.

Here, as shown FIG. 4(a), rough milling is first performed on an object 20a using an end mill with a diameter capable of milling the maximum area of a quadrangle for pocket milling.

Next, as shown in FIG. 4(b), by applying the above-mentioned milling method for forming a right-angled tetrahedron, the object 20b is milled so that one of the corners of the quadrangle for pocket milling is formed into a right angle. At this time, in a first step in which orthogonal milling is performed, the angle formed by the cutting edges 11a and 11b of the end mill 10 is maintained at the predetermined inclination angle D2 relative to each of the plane surfaces (x-y plane, y-z plane, and z-x plane in FIG. 3) that form a three-dimensional right angle. Then, maintaining the inclination angle D2, milling is performed until the distal portion of the end mill 10 reaches a point that becomes the apex of the three-dimensional right angle to be formed by pocket milling. Next, in a second step, milling is performed by pulling up the end mill 10 in a first direction in three-dimensional orthogonal milling (in the x-axis direction in FIG. 3) while maintaining the inclination angle D2. Milling is performed in a similar manner also for the other two directions (the y-axis direction and the z-axis direction in FIG. 3), and thus resulting in formation of a first apex of the pocket in which a right angle is formed. In other words, by using the end mill 10, a right-angled tetrahedron shown in FIG. 3 is formed through milling, inside the object 20b.

Then, as shown in FIG. 4(c) through FIG. 4(e), this right-angled tetrahedron is formed at the other three corners inside the object 20c to 20e through milling in a similar manner. Accordingly, three-dimensional orthogonal milling can be achieved even when using a rotary milling cutter such as the end mill 10, and pocket milling in which a cross-section of a pocket is rectangular can be achieved.

Figure 5:
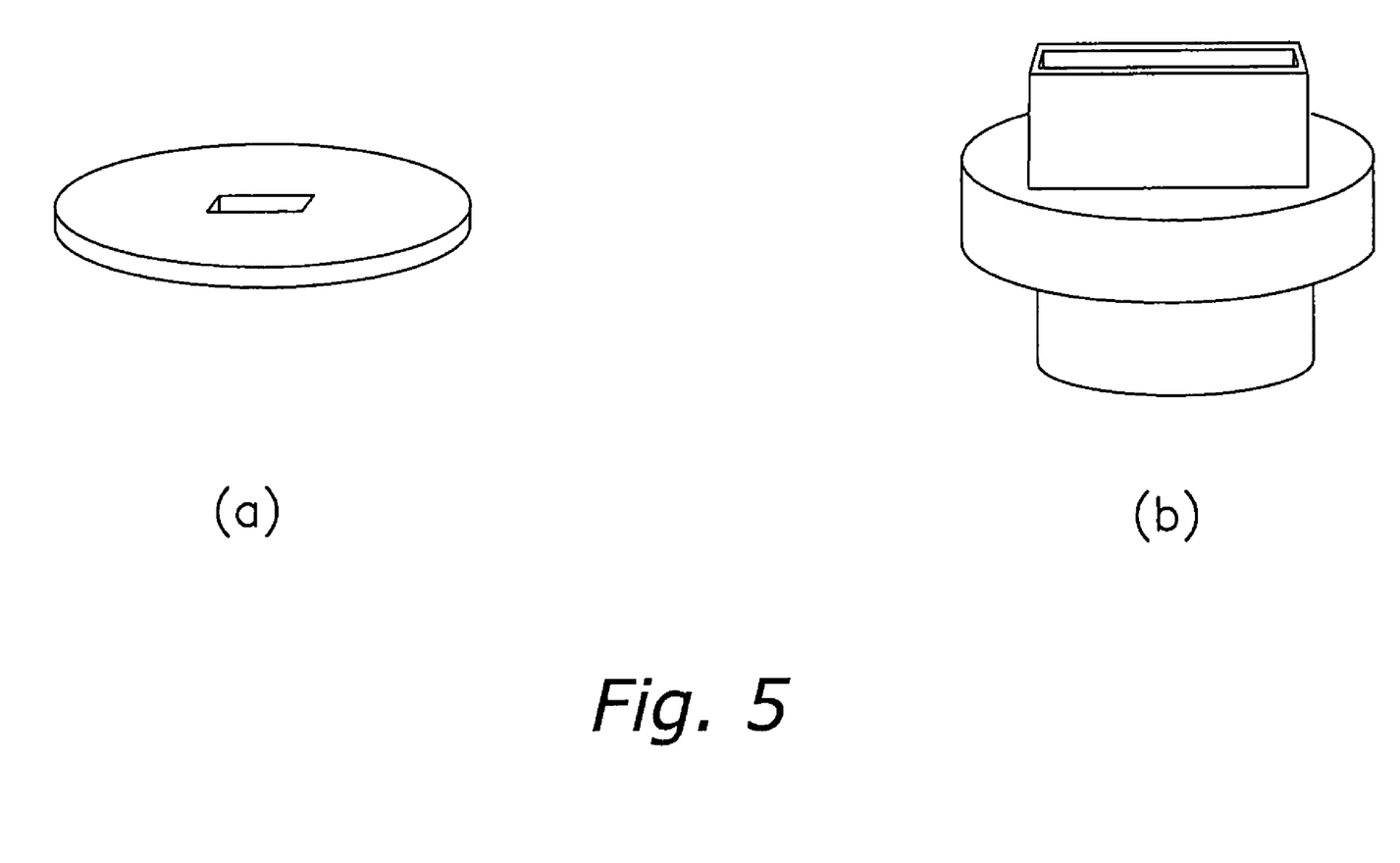
FIGS. 5(a) and 5(b) each shows an example of an object that was milled by the milling method according to the present invention.
Figure 7:
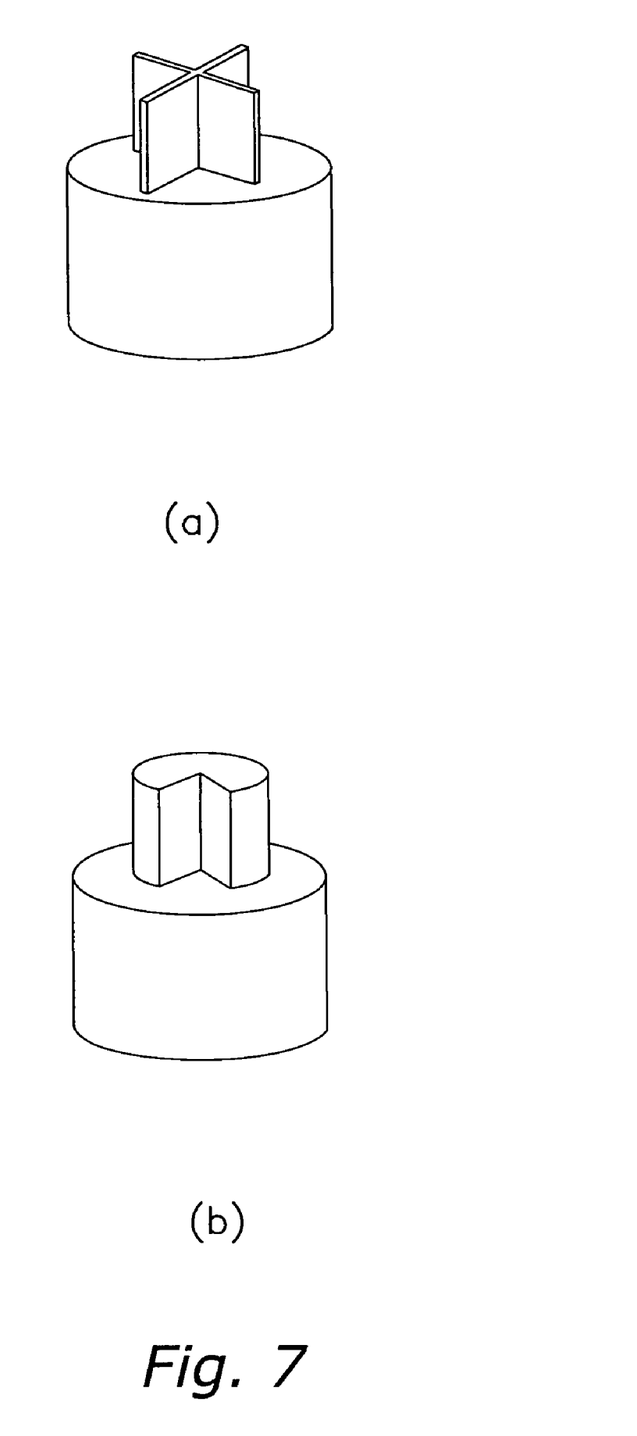
FIGS. 7(a) and 7(b) each shows another example of an object that was milled by the milling method according to the present invention.

In addition, according to the milling method of this embodiment, it is possible to easily mill a box-shaped hole in an oval-shaped object, as shown in FIG. 5(a) illustrating a quadrangular hole in the center of a oval disc, and it is also possible to easily form a thin-walled pocket as shown in FIG. 5(b) through pocket milling. Similarly, it is also possible to mill a cross shape in the plan view as shown in FIG. 7(a), and it is still also possible to mill a column and cut a one-quarter portion therefrom at the central angle of 90 degrees as shown in FIG. 7(b).

Chamfering Method Using the End Mill of the Present Invention

Figure 8:
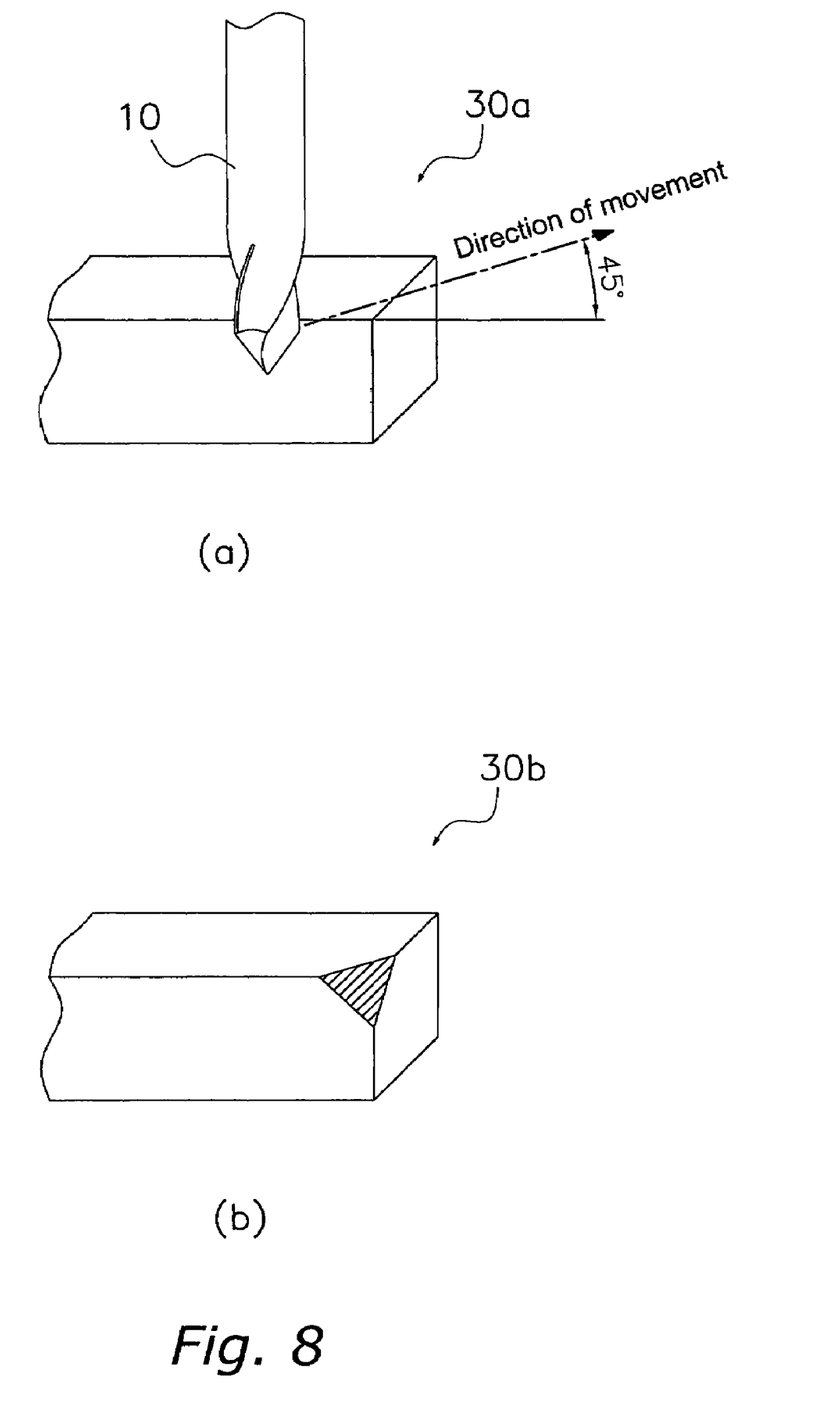
FIGS. 8(a) and 8(b) describe the principle of chamfering by the milling method according to the present invention.

When chamfering using the end mill 10 of this embodiment, as shown in FIG. 8(a), the rotation axis of the end mill 10 is held up vertically relative to the top surface (a first surface) of an object 30a having plane surfaces that intersect mutually perpendicularly in three dimensions. Then, in this state, the end mill 10 is moved at an angle of 45 degrees relative to a side that constitutes a corner between the plane surfaces in three dimensions. As a result, as shown in FIG. 8(b), the object 30b will have an equilateral triangle surface that is evenly formed on the three plane surfaces. This embodiment uses the principle that an equilateral triangle surface can be formed evenly on the three plane surfaces that intersect mutually perpendicularly when milling is performed using the end mill 10 according to a predetermined method. Consequently, it is possible to easily chamfer a portion D shown in FIG. 9(a) at a chamfering angle of 45 degrees, with the end mill 10 being held up vertically relative to the top surface of the object 30a.

Figure 9:
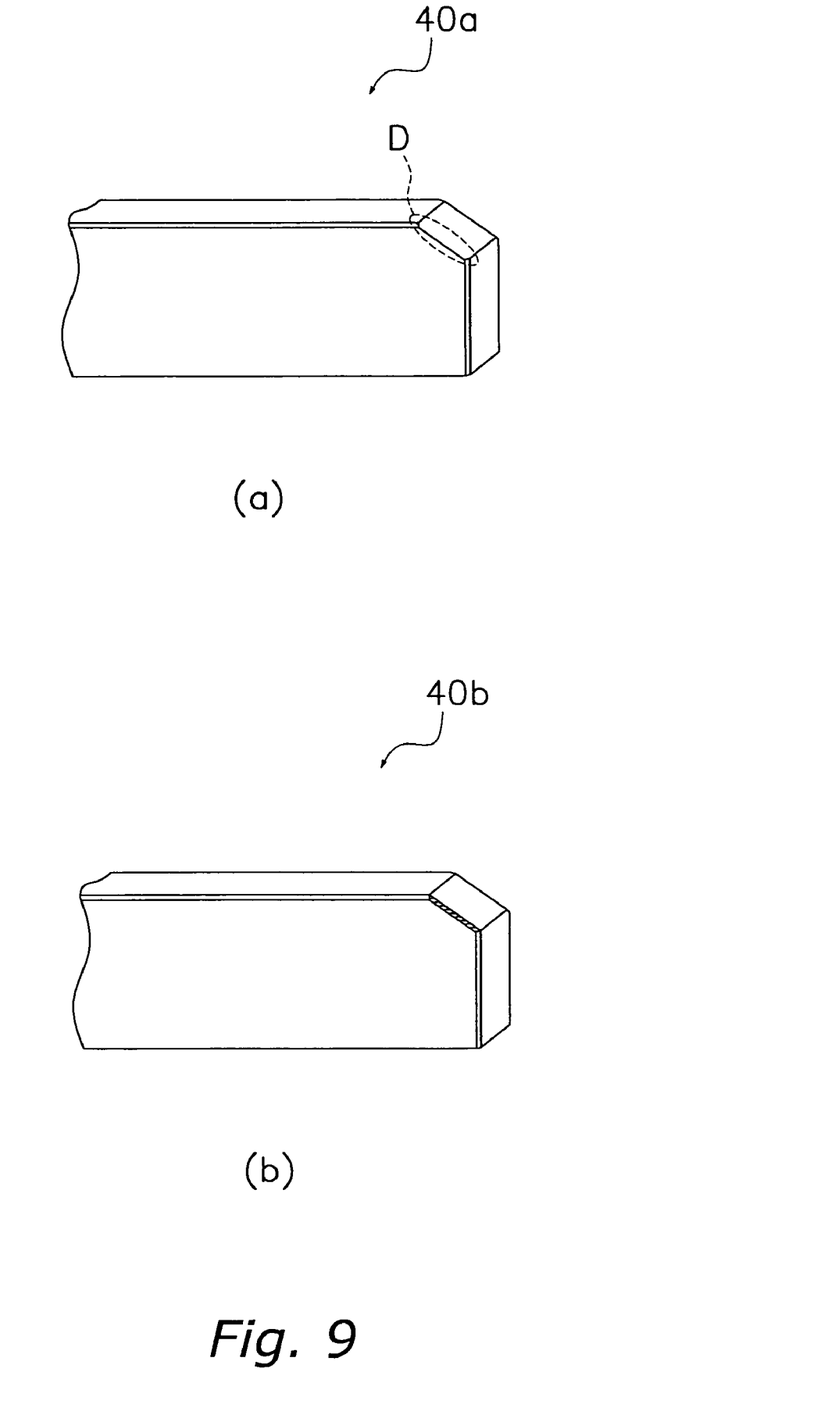
FIGS. 9(a) and 9(b) each shows an example of chamfering by the milling method according to the present invention.

Note that the object 40a comprises plane surfaces in three dimensions (top surface, side surface, and front surface), and the portion D shown in FIG. 9(a) illustrates the intersecting portion between the front surface and a fourth surface that is formed through 45 degree chamfering of the intersecting portion between the top surface and the side surface.

Usually, chamfering the portion D of the object 40a as shown in FIG. 9(a) at a chamfering angle of 45 degrees cannot be achieved simply by moving a rotary milling cutter having a 45-degree cutting edge in a state in which the rotary milling cutter is held up vertically. Therefore, finishing has been performed manually by skilled workers or by adjusting a rotary milling cutter such as an end mill having a 45-degree cutting edge according to a chamfering angle. However, with the manual work of skilled workers, there is a problem in that dimensional accuracy will easily vary. On the other hand, adjusting a rotary milling cutter to a predetermined angle has been inefficient since such setting is time consuming, even when portions to be milled are small in size and number.

Therefore, in this embodiment, as described above, the end mill 10 having an edge angle of about 71 degrees is used and moved in the direction as shown in FIG. 8(a) on the object 40a having a shape as shown in FIG. 9(a), with the end mill 10 being held up vertically relative to the top surface (first surface) of the object 40a. In this way, the top surface, side surface, and front surface of the object 40a can be evenly milled. Therefore, 45-degree chamfering can be performed on the intersecting portion D between the front surface and the fourth surface that is formed by evenly chamfering the intersecting portion between the top surface and the side surface. Consequently, the portion D shown in FIG. 9(a) can be chamfered in the way as shown by the shaded area in FIG. 9(b), and the object 40b can be milled in a short time with a high dimensional accuracy, compared to the conventional case where chamfering is performed by skilled workers, and the case where the angle of a cutting tool is adjusted to chamfer the portion D shown in FIG. 9(a).

Characteristics of the End Mill and the Milling Method Using the Same (1)

With the end mill 10 of this embodiment, as described above, the cutting edges 11a and 11b at the distal portion are disposed such that the angle α of each of the cutting edges 11a and 11b relative to the rotation axis is about 35 degrees. Also, the edge angle D1 formed by these two cutting edges 11a and 11b is twice as great as the angle α, which is about 71 degrees.

Usually, three-dimensional orthogonal milling cannot be performed using a rotary milling cutter. Therefore, a shape close to a right angle has been formed by repeatedly milling for a long time using a milling cutter whose diameter is as small as possible.

On the other hand, with the end mill 10 of this embodiment, as shown in FIG. 2, the cutting edge 11a or the cutting edge 11b is first fitted along a face of a right-angled tetrahedron, and milling is performed until the distal portions of the cutting edge 11a or 11b reaches a point that becomes the apex (original point shown in FIG. 2) of the right-angled tetrahedron. Then, milling is performed by pulling up the end mill 10 in each of the x-axis, y-axis, and z-axis directions while maintaining a certain inclination angle. At this time, the angle α of each of the cutting edges 11a and 11b relative to the rotation axis is about 35 degrees and the edge angle D1 is about 71 degrees. As a result, three-dimensional orthogonal milling can be achieved without the cutting edges 11a and 11b interfering with each of the plane surfaces in three dimensions. Consequently, forming each corner of a pocket in this way enables an efficient and time-saving pocket milling in which four right angle corners are formed using a rotary milling cutter such as the end mill 10.

Note that in the case of using an end mill having a cutting edge whose angle α relative to the rotation axis as described above is not about 35 degrees, pocket milling to form a right-angled tetrahedron shape, in other words, three-dimensional orthogonal milling, can not be performed. It is because the cutting edge 11a or 11b will interfere with another plane surface and the like when milling is performed by moving such an end mill 10 in the z-axis direction relative to the x-y plane. Therefore, the above-mentioned angle α being about 35 degrees is an essential structural element in order to perform three-dimensional orthogonal milling using the end mill 10.

(2)

The end mill 10 of this embodiment has the two cutting edges 11a and 11b disposed at the distal portion of the end mill 10 such that they are symmetric relative to the rotation axis.

In this way, since a plurality of the cutting edges 11a and 11b are provided symmetrically relative to the rotation axis, it is possible to achieve milling that is more stable than the case where milling is performed using a single cutting edge.

(3)

With the milling method using the end mill 10 of this embodiment, in the first step, milling is performed until the distal portion of the end mill 10 reaches a point that becomes the apex of a pyramid to be formed by milling. Then, in the second step, milling is performed by pulling up the end mill 10 from its position in the first step in the direction of each side that forms the pyramid, at a pulling angle of 35.3 degrees.

For example, when performing pocket milling to form a tetrahedron shape, in the first step, a point that becomes the apex of the tetrahedron is figured out, and milling is performed until the distal portion of the end mill 10 reaches the point. Then in the second step, milling is performed by pulling up the end mill 10 from the above-mentioned point in the direction of each of the three sides extending from the apex of the tetrahedron, while maintaining a certain inclination angle. At this time, when forming a right-angled tetrahedron, it is only necessary to perform milling by pulling the end mill 10 in each of the x-axis, y-axis, and z-axis directions, with the apex of the tetrahedron as the origin.

In this way, even with a rotary milling cutter such as the end mill 10, which is usually used for circular milling, a pyramid shape can be easily formed.

(4)

With the milling method using a rotary milling cutter of this embodiment, the rotation axis of the end mill 10 is maintained at the inclination angle D2 (about 55 degrees) relative to the direction perpendicular to a surface of the object 20, and in this state, milling is performed in each direction.

Here, the angle α of each of the cutting edges 11a and 11b relative to the rotation axis is about 35 degrees as described above. Therefore, when milling is performed while maintaining the inclination angle D2, it is possible to mill in a state in which the cutting edge 11a or 11b is fitted along a surface to be milled. In this way, for example, in the case of pocket milling for forming a tetrahedron shape, milling is performed by fitting the angle of the cutting edge 11a or 11b along the x-y plane and moving the end mill 10 in the z-axis direction, so that a right angle between the x-y plane and the z-axis is first formed. Then, milling in a similar way in the direction of the x-axis relative to the y-z plane and in the direction of the y-axis relative to the z-x plane results in pocket milling in which a right-angled tetrahedron is formed, in other words, three-dimensional orthogonal milling is achieved.

(5)

With the milling method using a rotary milling cutter of this embodiment, the end mill 10 having the cutting edge whose angle relative to the rotation axis is about 35 degrees is moved, with the rotation axis being maintained perpendicular to the top surface of the object 30a shown in FIG. 8(a), in the direction that is 45 degrees relative to a side that constitutes the top surface.

In this way, as shown in FIG. 8(b), it is possible to form an equilateral triangle that is evenly formed on the three plane surfaces that mutually intersect perpendicularly. Also, using this principle, the right angle of the portion D of the object 40a shown in FIG. 9(a) can be chamfered at 45 degrees as shown in the shaded area in FIG. 9(b).

As a result, the portion D shown in FIG. 9(a) can be chamfered at 45 degrees efficiently without the troublesome setting of the angle of the end mill 10 for adjustment. Also, chamfering can be performed with less variation in accuracy than the case in which chamfering is manually performed by skilled workers.

OTHER EMBODIMENTS

While only one embodiment of the present invention has been explained, the scope of the invention is not limited to the above-described embodiment, and various changes and modifications can be made herein without departing from the scope of the invention.

(A)

The above embodiment is described using an example in which each of the cutting edges 11a and 11b attached to the distal portion of the end mill 10 forms an angle α of about 35 degrees relative to the rotation axis of the end mill 10. However, the milling method using a rotary milling cutter of the present invention is not limited to the above embodiment.

For example, when forming a three-dimensional right angle by milling using a rotary milling cutter such as an end mill, the rotary milling cutter must have an angle α of about 35 degrees as described above. However, when milling is performed simply to form a pyramid shape such as a tetrahedron or a quadrangular pyramid but not a three-dimensional right angle, the angle α need not be about 35 degrees as described above.

Also, the edge angle D1 and the inclination angle D2 are not limited to be about 71 degrees and about 55 degrees respectively, when milling is performed simply to form a pyramid shape but not a three-dimensional right angle.

(B)

The above embodiment is explained using an example in which the end mill 10 is used as a rotary milling cutter to which the present invention is applied. However, the present invention is not limited to the above embodiment. For example, the present invention can be applied to a different rotary milling cutter such as a drill. Also, the end mill 10 includes various types, and the present invention can be applied to these various end mills including a taper end mill.

(C)

The above embodiment is described using an example in which the two cutting edges 11a and 11b are provided at the distal portion of the end mill 10 such that they are symmetric relative to the rotation axis. However, the present invention is not limited to the above embodiment. For example, even in the case where there is one cutting edge or there are three or more cutting edges, the same effect as described above can be achieved as long as the each cutting edge is provided such that its angle relative to the rotation axis is about 35 degrees.

(D)

The above embodiment is explained using an example in which milling is performed on metal such as a metal mold. However, the present invention is not limited to the above embodiment. For example, the present invention can be applied to wood processing and resin treatment.

INDUSTRIAL APPLICABILITY

The present invention is applicable to three-dimensional orthogonal milling when pocket milling is performed on a molding die, a metal part, and the like using a rotary milling cutter.

What is claimed is:

1. A rotary milling cutter, comprising:
a rotation axis;
a distal portion;
a proximal portion being arranged opposite the distal portion on the rotation axis; and
a cutting edge disposed on the distal portion of the rotary milling cutter, the cutting edge forming an angle being equal to $\arctan(1/\sqrt{2})$ with respect to the rotation axis and the proximal portion of the rotary milling cutter.

2. The rotary milling cutter according to claim 1, wherein the cutting edge is one of a plurality of cutting edges disposed along the rotation axis.

3. The rotary milling cutter according to claim 1, wherein the rotary milling cutter is an end mill.

4. A milling method comprising:
performing milling on an object with a rotary milling cutter having a cutting edge disposed on a distal portion of the rotary milling cutter until the distal portion of the rotary milling cutter reaches a predetermined point in the object; and
performing milling on the object while pulling the rotary milling cutter up from the predetermined point at a fixed angle of inclination in the direction in which a V-groove is to be formed in the object.

5. The milling method according to claim 4, wherein the rotary milling cutter is pulled up in the direction of the intersection of two tangents of a circle formed on a surface of the object as a result of milling by the rotary milling cutter.

6. The milling method using a rotary milling cutter according to claim 4, wherein the cutting edge forms an angle of approximately 35 degrees with respect to the rotation axis of the rotary milling cutter.

7. The milling method according to claim 6, wherein the cutting edge is one of a plurality of cutting edges disposed along the rotation axis.

8. The milling method according to claim 6, wherein milling is performed with the rotation axis of the rotary milling cutter inclined at about 55 degrees relative to a direction that is perpendicular to the milling surface of the object.

9. The milling method according to claim 4, wherein the rotary milling cutter is an end mill.

10. The milling method using a rotary milling cutter according to claim 4, wherein the angle is equal to $\arctan(1/\sqrt{2})$.

11. A milling method comprising:
providing an object having three plane surfaces that mutually intersect perpendicularly;
providing a rotary milling cutter having
a rotation axis,
a distal portion,
a proximal portion being arranged opposite the distal portion on the rotation axis, and
a cutting edge disposed on the distal portion thereof, the cutting edge forming an angle being equal to $\arctan(1/\sqrt{2})$ with respect to the rotation axis and proximal portion of the rotary milling cutter;
setting the rotary milling cutter on a first of the three plane surfaces of the object so as to be perpendicular thereto; and
performing milling while moving the rotary milling cutter at 45 degrees relative to a side of the first plane surface that forms a corner portion thereof.

* * * * *